United States Patent

Lin

[11] Patent Number: 5,946,123
[45] Date of Patent: Aug. 31, 1999

[54] SCAN-RANGE-CHANGING MECHANISM OF A SCANNER

[76] Inventor: Bob Lin, No. 9, Lane 102, San-Min Rd., Taipei, Taiwan

[21] Appl. No.: 09/042,507

[22] Filed: Mar. 17, 1998

[51] Int. Cl.⁶ .................................................. G02B 26/08
[52] U.S. Cl. ............................................ 359/210; 355/59
[58] Field of Search ........................ 359/210; 355/55–56, 355/58–59

[56] References Cited

U.S. PATENT DOCUMENTS 5,535,040   7/1996   Ohtsuka et al. ........................ 359/210

Primary Examiner—James Phan
Attorney, Agent, or Firm—Bacon & Thomas, PLLC

[57] ABSTRACT

A scan-range-changing mechanism of a scanner includes a scanning-scale ruler, a charge coupled device (CCD), a sliding seat which supports single-axis or two-axis moving capabilities, a plurality of lenses which are rigidly fixed on a sliding seat and located between the scanning-scale ruler and the CCD, and a plurality of scanning labels on the scanning-scale ruler for aligning and focusing the lenses with respect to the CCD.

2 Claims, 8 Drawing Sheets

SCAN-RANGE-CHANGING MECHANISM OF A SCANNER

FIELD OF THE INVENTION

The present invention relates to a scan-range-changing mechanism of a scanner used for scanning different size documents with different resolutions.

BACKGROUND OF THE INVENTION

Scanners are important devices in information processing. For example, by using a scanner, the contents of a book can be transferred to digital image data saved in a computer. Further, the digital data can be compressed and saved in a hard disk with smaller memory space and the digital data can be delivered to a remote location through networks or a fax machine.

It is a line-by-line process to scan documents with a scanner. For example, the scanned image of a document is composed of all line information. Hence, the resolution of a scanner is determined by the number of the scanning device's pixels per unit length. The major scanning devices of a scanner are a lens and a charge coupled device (CCD). The captured image of a document is projected by the lens onto the CCD. If there is no scan-range-changing mechanism in the scanner, it will happen that the whole image of a document with larger size cannot be completely scanned, and the resolution of scanned images is not adjustable. This kind of scanners is not user friendly.

Taiwan Pat. No. 235,112 describes a multi-lens scanner, which is composed of a sensor's seat and a lens device. The sensor's seat is set at an appropriate location, and the lens device locates ahead the sensor's seat. The lens device is bar-shaped with suitable length, and, upon it, these are a plurality of lenses for scanning, which these are equally spaced. On the bottom of the lens device, there are a curved groove and a rack fixed near one end of the curved groove. Under the lens device, there is a base, where a curved guide is fixed on the base's top at a location related to the curved groove, and the curved guide slides in the curved groove. In addition, there is a set of pinions engaged with the rack. The set of pinions can be clockwise or counterclockwise driven by a motor, and the rack is then moved. Consequently, the lens device is moved on the base.

It is important that, in the prior art, there is no mechanism to support the alignment of the sensor (such as CCD) and the lens. Hence, there exist the following drawbacks:
1. Misalignment and misfocus of the sensor and the lens can easily happen when the scanner is delivered.
2. The compatibility of the scanner is poor. If there are multiple lenses with different focus lengths, a blurry image of a document is generated when the lens is changed to another. The scanning quality is consequently reduced.

BRIEF SUMMARY OF THE INVENTION

It is the major objective of the present invention to support a scan-range-changing mechanism with simple structure and precision positioning function. The lenses of the scan-range-changing mechanism in the present invention have single-axis or two-axis mobility by a driving device. There are scanning labels to align and focus the lenses to the charged couple device. Hence, with different lenses, the scanner with the scan-range-changing mechanism of the present invention also supports clear scanning images.

PREFERRED EMBODIMENT OF THE INVENTION

Figure 2:
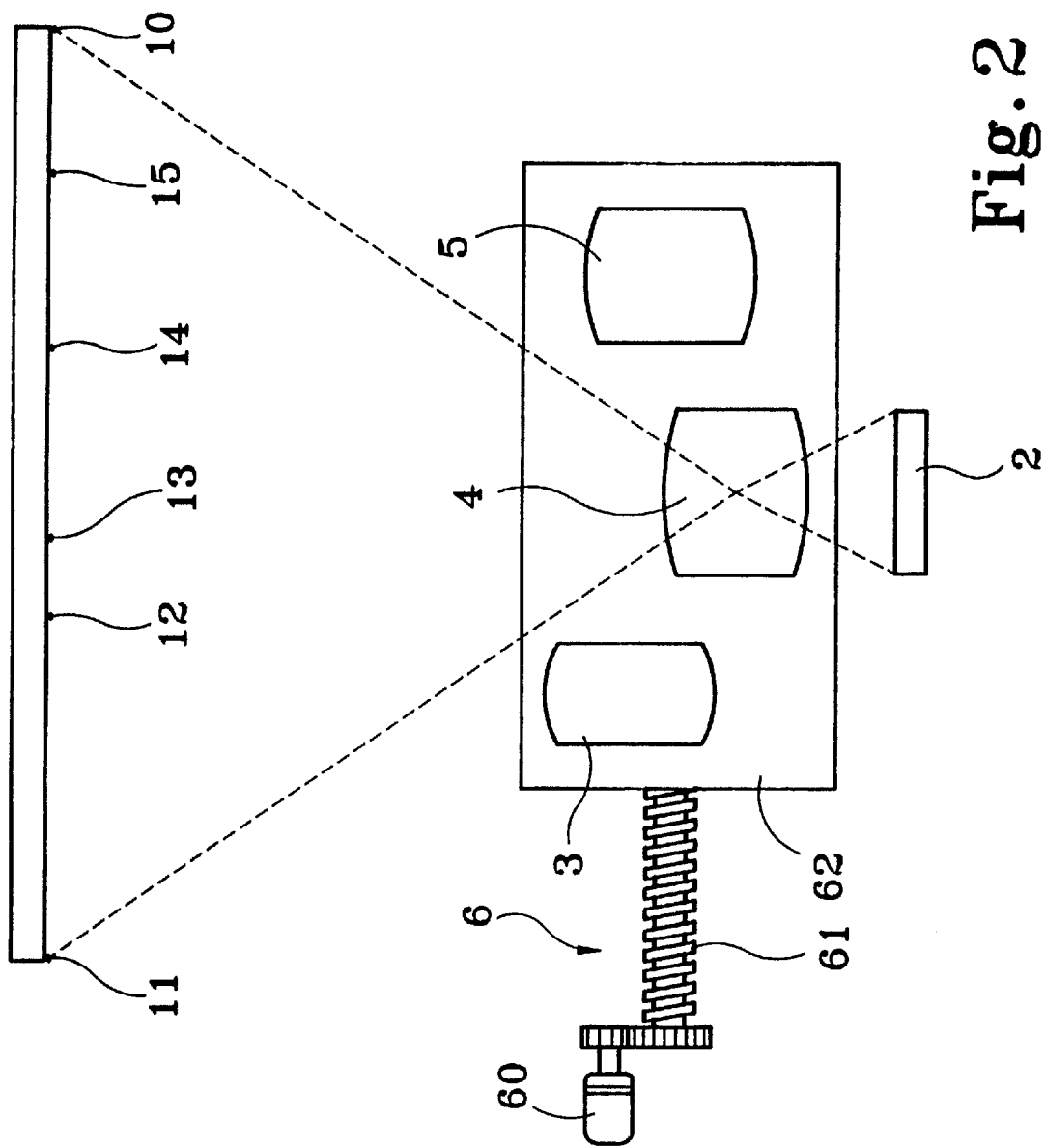
FIG. 2 is a schematic diagram of the present invention.

Please refer to the FIG. 2. The scan-range-changing mechanism of a scanner according to the present invention is composed of a scanning-scale ruler 1, a charge coupled device (CCD) 2, a first lens 3, a second lens 4, and a third lens 5, where the three lenses are located between the scanning-scale ruler 1 and the CCD 2. In order to project the different scanning labels of the scanning-scale ruler 1 onto the CCD 2, these lenses are driven by a driving device 6 to be selectively aligned with the CCD 2.

The above driving device 6 is composed of a motor 60, a rolling screw 61 driven by the motor 60, and a nut-like sliding seat 62 which can be moved by the screw 61. The rolling screw 61 and sliding seat 62 can be replaced with a rack and pinion. The above lenses 3, 4, 5 are rigidly fixed upon the sliding seat 62, and the scanning-scale ruler 1 has different scanning labels 10, 11, 12, 13, 14, 15, which locate at their appropriated positions for denoting the different scanning ranges. Hence, the precision scanning alignment of the lenses 3, 4, 5 and CCD 2 can be achieved with the help of the scanning labels 10, 11, 12, 13, 14, and 15. The detailed description will be shown later.

Figure 3:
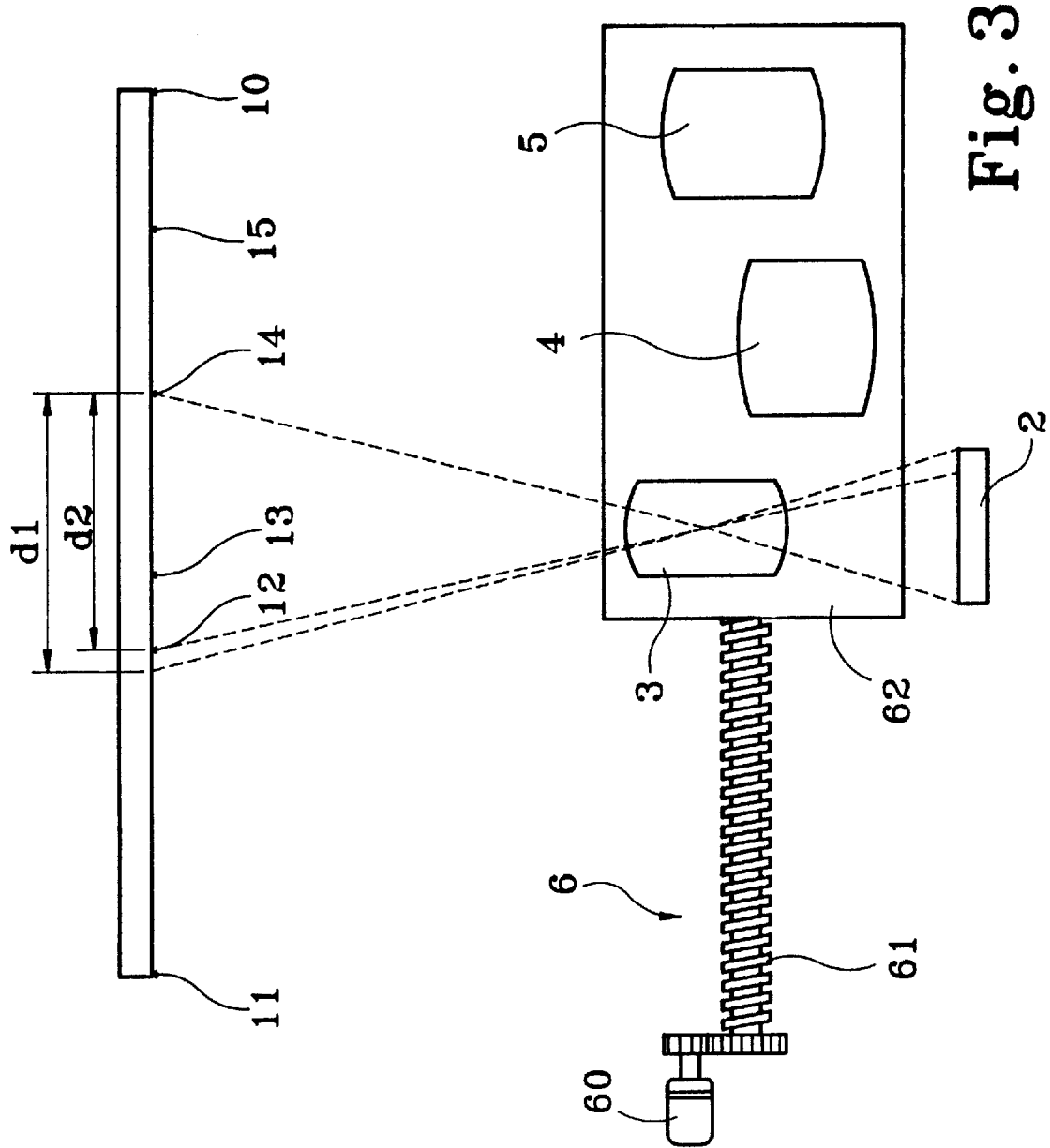
FIG. 3 is a schematic diagram of the present invention's operation.
Figure 4:
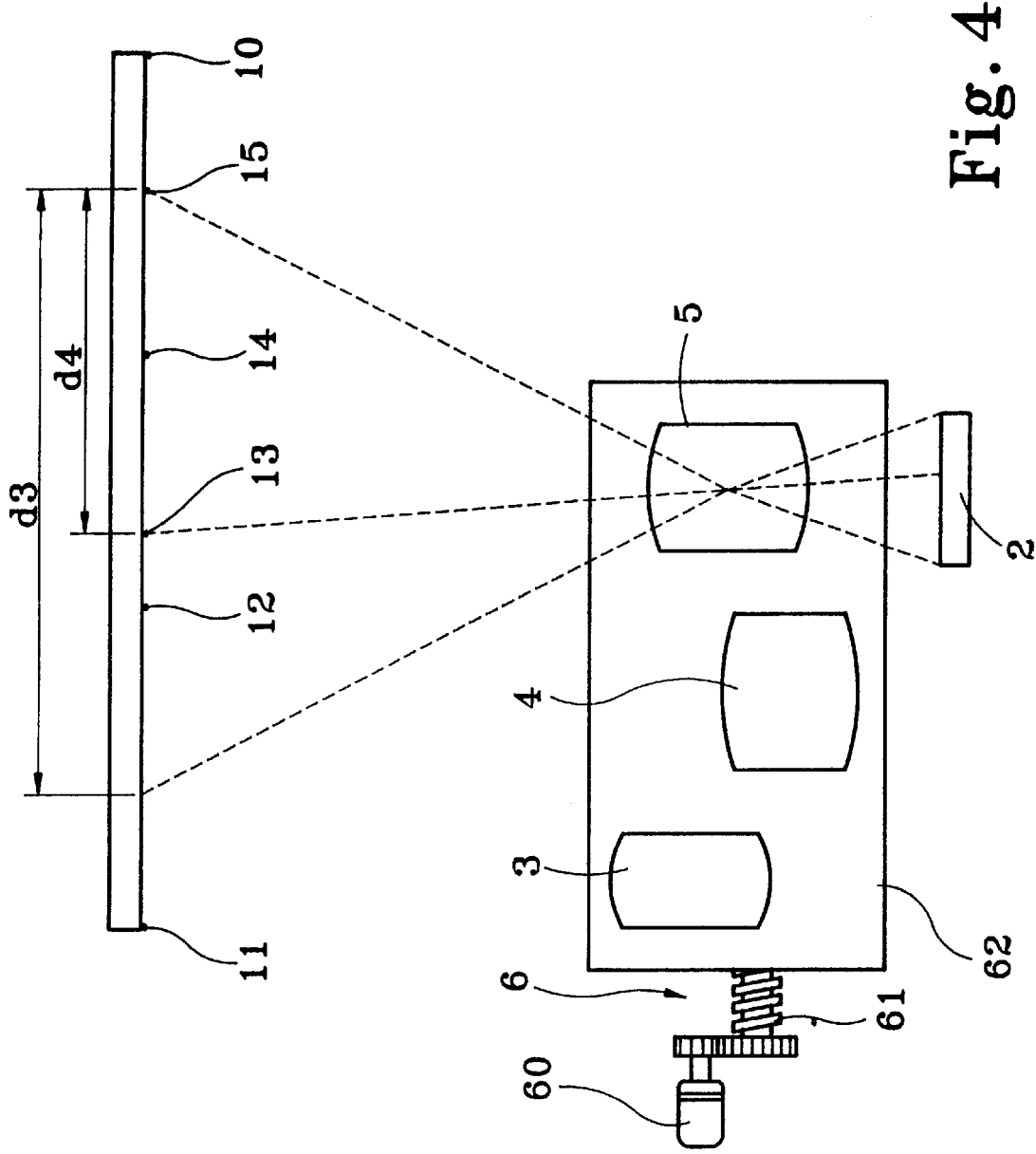
FIG. 4 is another schematic diagram of the present invention's operation.
Figure 5:
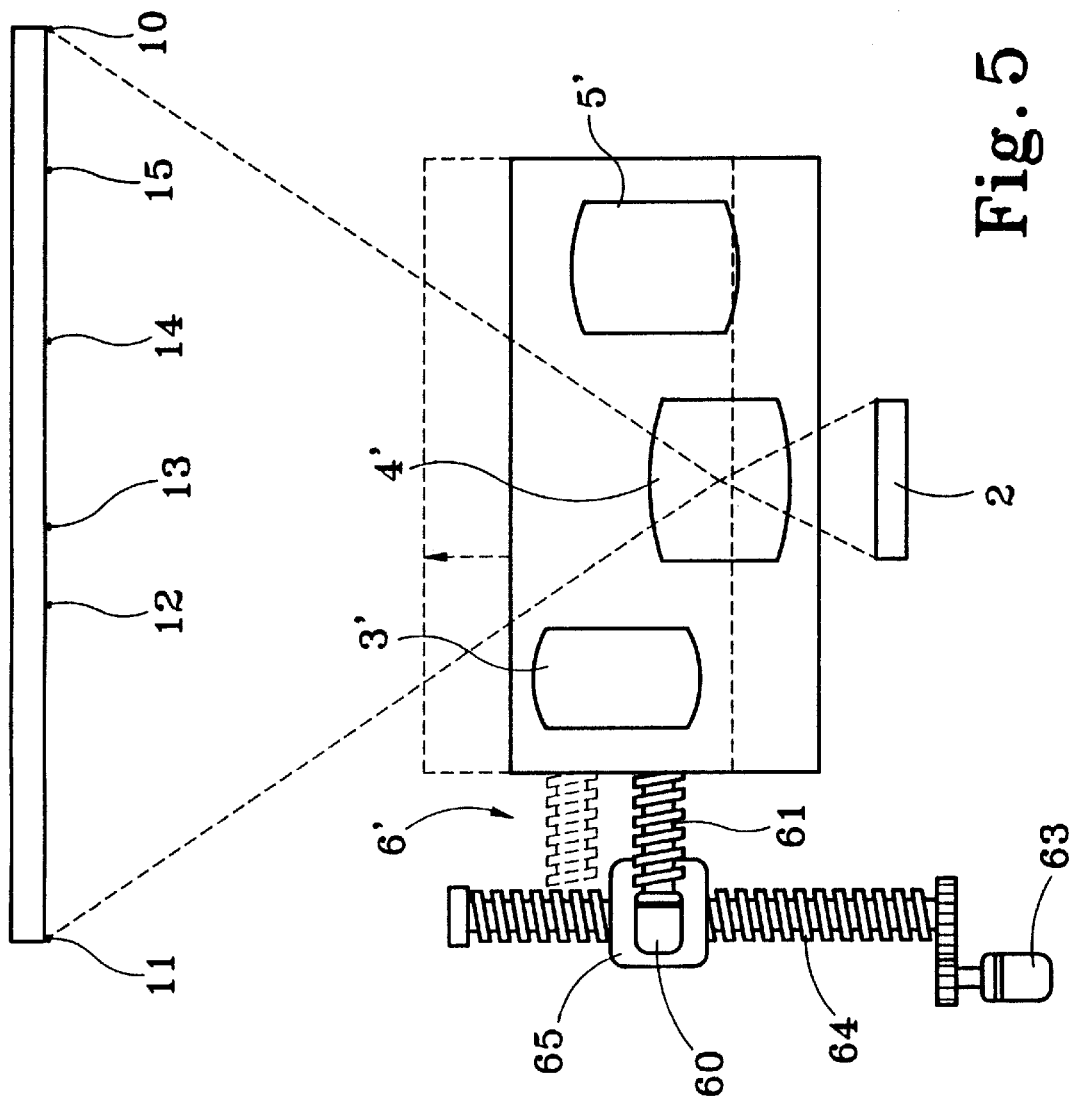
FIG. 5 is a preferred embodiment of the present invention.

FIG. 3 and FIG. 4 are schematic diagrams of the operating of the scan-range-changing mechanism shown in FIG. 2. These diagrams show the independent alignments of the lenses 3, 4, 5 and the CCD 2. For the different specifications of lenses 3', 4', and 5', FIG. 5 shows a preferred embodiment of the present invention, whose driving device 6' is designed with a two-axis mechanism. The driving device 6' is composed of a fine-tune motor 63, a second rolling screw 64 driven by the fine-tune motor 63, and a nut-like sliding base 65 moved upon the second rolling screw 64. The second rolling screw 64 is orthogonally aligned with the above rolling screw 61 for focusing the lenses 3', 4', and 5' to capture clear images. In addition, with the help of the scanning labels 10, 11, 12, 13, 14, 15, the CCD 2 captures the labels' images to successfully achieve the automatic focus.

To describe the operation of the automatic focus, please refer to FIG. 2, FIG. 3, and FIG. 3. In FIG. 2, the CCD 2 is directly aligned with the second lens 4, and the images of the scanning labels 10 and 11 on both ends of the scanning-scale ruler 1 are then projected onto both ends of the CCD 2. At the same time, the position of the second lens 4 is its positioning location. For example, assume the number of the CCD's 2 pixels is 510. When the first pixel and the 510th pixel simultaneously sense the images of the scanning labels 10 and 11, positioning of the second lens 4 can be completed. In FIG. 4, when the images of the scanning labels 14 and 12 are immediately projected onto the first pixel and the (510×d2/d1)th pixel of the CCD 2, the first lens 3 is now at its positioning location. In FIG. 4, when the images of the scanning labels 15 and 13 are immediately projected onto the first pixel and the (510×d4/d3)th pixel of the CCD 2, the third lens 5 is now its positioning location. These positioning locations of the lenses 3, 4, 5 are used as the reference positions in the positioning feedback control. In addition, the feedback information contain the locations of the CCD's 2 pixels which sense the images of the scanning labels 10, 11, 12, 13, 14, 15. The design of feedback-control circuits is a well developed technology, the detailed description is hence omitted.

Figure 6:
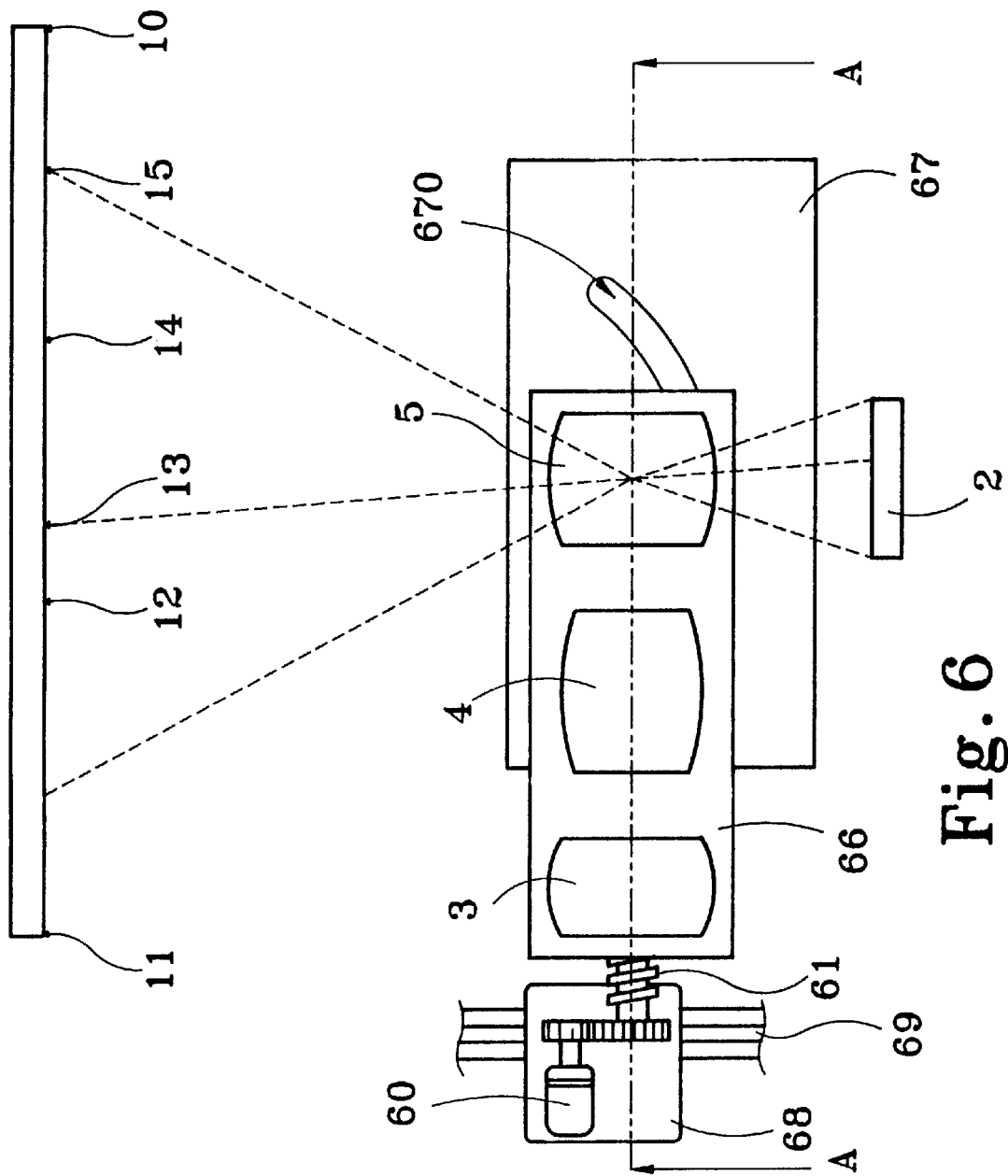
FIG. 6 is another preferred embodiment of the present invention.
Figure 7:
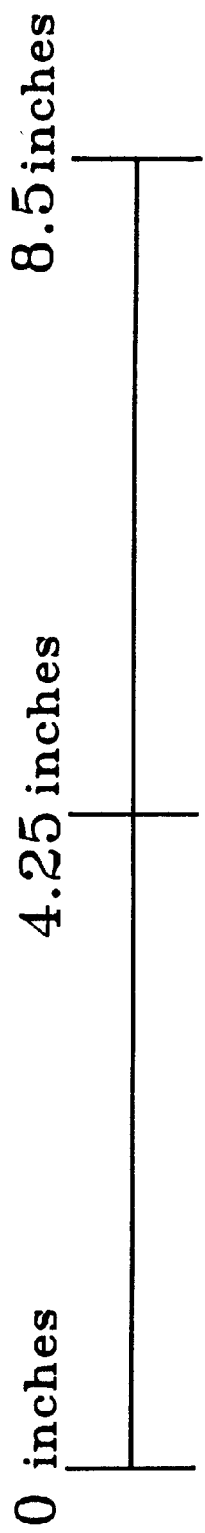
FIG. 7 is a schematic diagram of the effective scanning range with A4 size.

FIG. 6 is another preferred embodiment of the present invention, and its objective is the same as the above preferred embodiment shown in FIG. 5. In order to satisfy the different lenses 3', 4', 5', the CCD 2 of the scan-range-changing mechanism is fixed on a seat 90 to adjust the distance between the CCD 2 and the lenses 3', 4', 5' for catching clear images, where the seat 90 is driven by the fine-tune motor 63 in the direction perpendicular to the second rolling screw 64.

Figure 1:
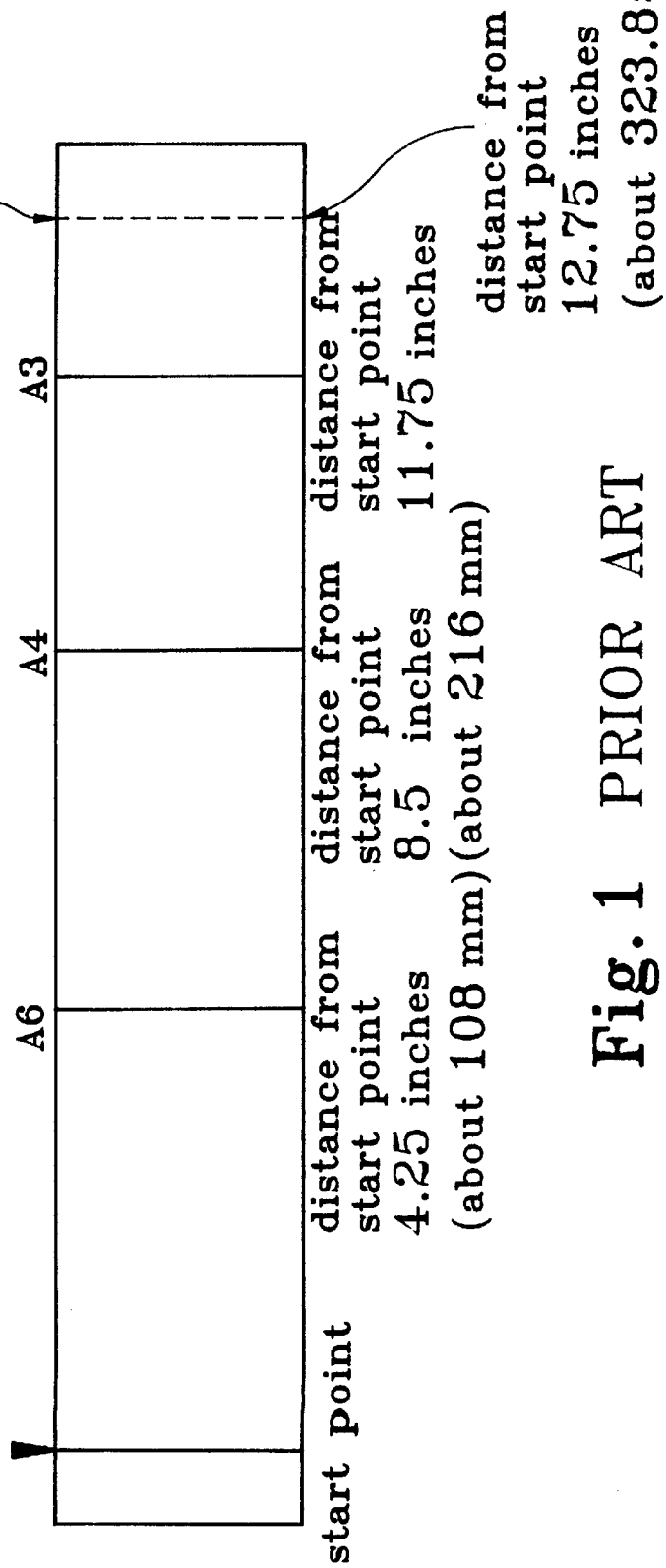
FIG. 1 is a schematic diagram of the scanning labels in the prior art.

In order to clearly describe the methods to find the positioning locations of the above lenses with the best scanning results, an example is shown as follows:

FIG. 1 shows a set of scanning labels which is usually used in the conventional copy machines, and the canning labels of the copy machines with different brands usually have different formats. Now, the set of scanning labels in FIG. 1 is used to illustrate the methods of finding the positioning locations of the lenses with the best scanning results.

The formats of the scanning labels denoting A6, A4, A3 are as shown in FIG. 1. The CCD possesses 5100 pixels, and the optimal resolutions of A6, A4, A3 are individually 1200 DPI, 600 DPI, and 400 DPI. The best distances of the scanning labels denoting A6, A4, A3 from the start point are independently 4.25 inches (about 108 mm), 8.5 inches (about 216 mm), and 11.75 inches (about 216 mm). It is noted that the image of a scanning labels projected on the CCD is practically sensed by a plurality of contiguous pixels. But, for simplifying the illustration below, it is assumed that the image of a scanning label on the CCD is only sensed by one pixel. The method to find the positioning location of a lens with the best scanning result is shown below:

1. When a piece of document with A6 size is scanned in the 1200 DPI resolution, the effective scanning range of A6 size is 4.25 inches (about 108 mm). With the first lens 3 in FIG. 2, the first pixel and the 5100th pixel of the CCD immediately sense the images of some scanning labels, and the other pixels do not sense any image. At the same time, the first lens 3 is positioned location to scan a document with A6 size.
2. When a piece of document with A4 size is scanned in the 600 DPI resolution, the effective scanning range of A4 size is 8.5 inches (about 108 mm). With the second lens 4 in FIG. 2, the first pixel, the 2550th pixel, and the 5100th pixel of the CCD immediately sense the images of some scanning labels, and the other pixels do not sense any image. At the same time, the first lens 4 is positioned to scan a document with A4 size.
3. When a piece of document with A3 size is scanned in the 400 DPI resolution, the effective scanning range of A3 size is (400 DPI×11.75 inches)=4700 pixels on the CCD. With the third lens 5 in FIG. 2, the first pixel, the 1700th pixel, the 3400th pixel, and the 4700th pixel of the CCD immediately sense the images of the scanning labels, and the other pixels do not sense any image. At the same time, the first lens 5 is positioned to scan a document with A3 size. To sum up, the above results are described in the following table.

|   | Pixels Sensing Images | Scanning Status |
|---|---|---|
| 1 | 1, 5100 | A6/1200 DPI |
| 2 | 1, 2550, 5100 | A4/600 DPI |
| 3 | 1, 1700, 3400, 4700 | A3/400 DPI |
| 4 (for reference) | 1, 1700, 3400, 4700, 5100 | 12.75 inches/400 DPI |

The above results can be used to achieve the following:
1. To check whether the position of the lens is at the correct scanning region (such as A6, A4, or A3) or not.
2. To check whether the focus and magnifying power of the lens are correct or not. If the width of the scanning labels and the distances between the scanning labels are known, the pixels of the CCD sensing the scales' images must be consequently defined (such as defined in the above table). When the pixels sensing the scales' images are not the defined pixels, the magnifying power of the lens is not correct. It can be correctly modified by moving the position of the lens forward or backward. For example, at 600 DPI scanning status, the defined pixels which sense the scales' images are the first pixel, the 2550th pixel, and the 5100th pixel. If the 100th pixel, the 2550 pixel, and the 3100th pixel sense the scales' images, the magnifying power can be corrected by moving the position of the lens backward until the first pixel, the 2550 pixel, and the 5100th pixel simultaneously sense the scales' images. This method can also be used to adjust the focus of the lens.

Figure 8:
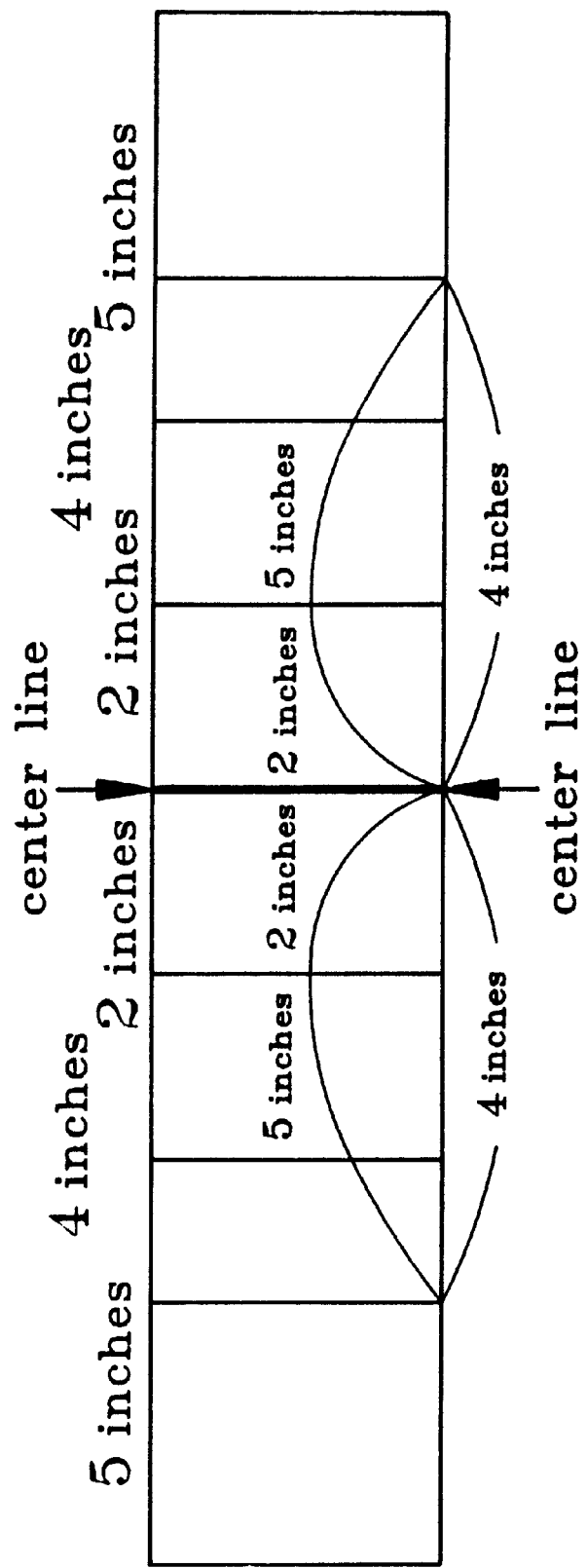
FIG. 8 is a schematic diagram of the scanning range with another size.
Figure 9:
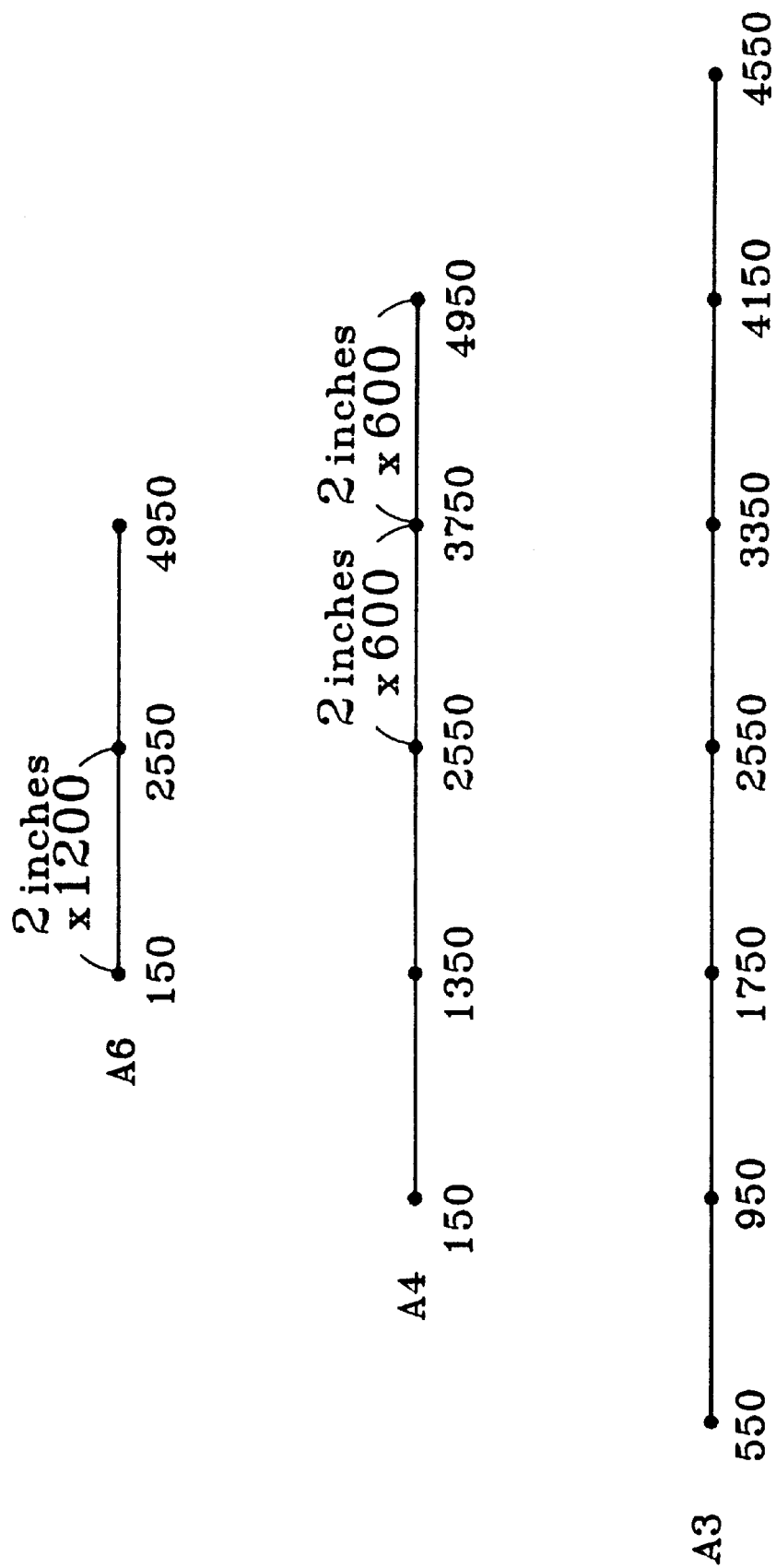
FIG. 9 shows the effective scanning range of a scanned object in FIG. 8.

Please refer to the FIG. 8 and FIG. 9. FIG. 8 shows another set of scanning labels. The difference between the scanning labels in FIG. 8 and FIG. 1 is that the start point in FIG. 1 is now the center point in FIG. 8. Similarly, with the set of scanning labels in FIG. 8, the positioning location of a lens with the best scanning result is shown as following table.

|   | Pixels Sensing Images | Range | Resolution | Scales' Distances |
|---|---|---|---|---|
| 1 | 150, 2550, 4950 | A6 | 1200 DPI | 2 inches |
| 2 | 150, 1350, 2550, 3750, 49500 | A4 | 600 DPI | 2 and 4 inches |
| 3 | 550, 950, 1750, 2550, 3350, 4150, 4550 | A3 | 400 DPI | 2, 4, and 5 inches |

Consequently, the scan-range-changing mechanism of a scanner in the present invention really improves the drawbacks of the prior arts.

What is claimed is:

1. A scan-range-changing mechanism of a scanner which comprises a scanning-scale ruler, a plurality of scanning labels on the scanning-scale ruler, a charge coupled device (CCD), and a plurality of lenses which are located between said CCD and said scanning-scale ruler, and project the images of the scanning labels onto said CCD, characterized in that: said lenses are rigidly fixed on a nut-like sliding seat which seats and slides on a rolling screw to aim one lens at said CCD; said rolling screw is rotated by a motor; and said scanning-scale ruler has a plurality of scanning labels for exactly aligning the lenses with respect to said CCD.

2. The scan-range-changing mechanism of a scanner of claim 1, wherein said motor is rigidly fixed on a nut-like sliding base which is seated and slides on another rolling screw a distance of said lenses from said CCD; said second rolling screw is rotated by a fine-tune motor, a direction of said second rolling screw is perpendicular to said first rolling screw; and said second rolling screw is rotated by said fine-tune motor until defined pixels of said CCD simultaneously sense said scanning labels to thereby focus images of said scanning scale on said CCD.

* * * * *